F. IZZO.
NUT LOCK.
APPLICATION FILED AUG. 3, 1918.

1,288,599.

Patented Dec. 24, 1918.

INVENTOR:
Francesco Izzo.
by H. J. S. Dennison
atty

UNITED STATES PATENT OFFICE.

FRANCESCO IZZO, OF TORONTO, ONTARIO, CANADA.

NUT-LOCK.

1,288,599.  Specification of Letters Patent.  Patented Dec. 24, 1918.

Application filed August 3, 1918. Serial No. 248,198.

*To all whom it may concern:*

Be it known that I, FRANCESCO IZZO, a subject of the King of Great Britain, and resident of the city of Toronto, county of York, Province of Ontario, in the Dominion of Canada, have invented certain new and useful Improvements in Nut-Locks, described in the following specification and illustrated in the accompanying drawings, that form part of the same.

The principal objects of this invention are to devise a secure form of nut lock which will be particularly adaptable for use upon automobiles, bicycles and other devices where the appearance is a factor of consideration, but which of course may be used in any desirable manner and further to devise a form of lock which will be very efficient in holding the nut from turning but may be easily and quickly released.

The principal feature of the invention consists in the novel construction of the bolt and the means for securing the nut and the means for holding or locking the securing means in place, whereby the nut engaging member is non-rotatably secured upon the bolt and is held in its position by a removable plate engaging a recessed portion of the bolt and said removable plate is secured by a locking key.

In the drawings Figure 1 is an elevational view of the bolt showing the nut and locking member in section.

Figure 1:
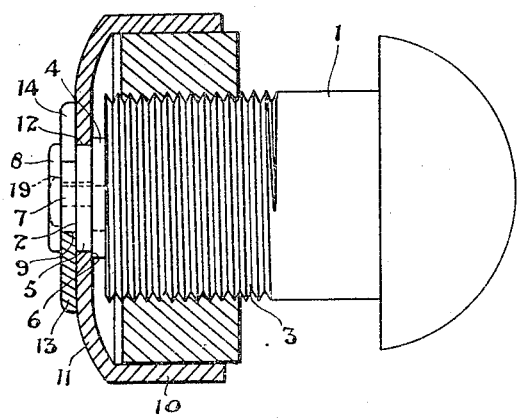
Figure 2:
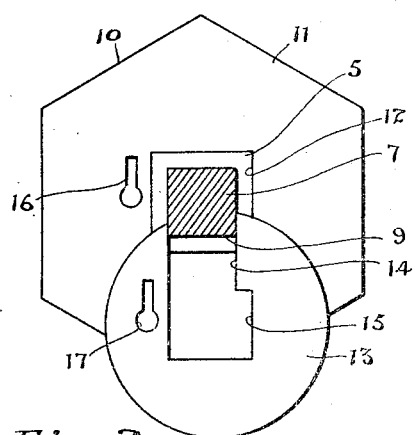
Fig. 2 is an end elevational view of the nut holding member showing the end of the bolt in section and the locking washer being placed in position.
Figure 3:
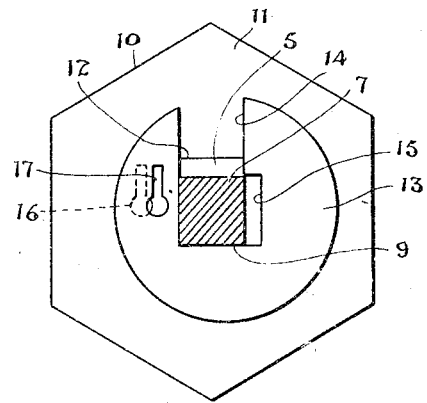
Fig. 3 is a view similar to Fig. 2 showing the washer partly in place.
Figure 6:
Fig. 6 is a perspective detail of the locking key.
Figure 4:
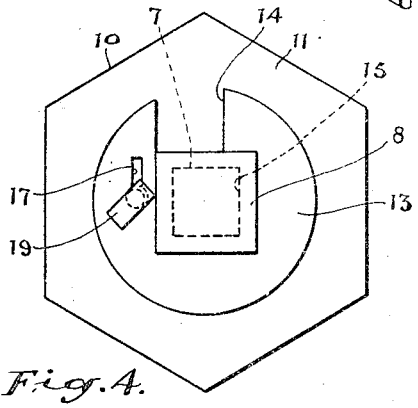
Fig. 4 is a similar view showing the lock washer in place and the locking key in position and partly turned.

The bolt 1 is formed with a central stem portion 2 extending beyond the threaded portion 3. This stem portion is formed square or hexagonal as may be desired and the inner portion 4 adjacent to the threaded part of the bolt is of larger diameter than the portion 5, the shoulder 6 formed between the two parts being spaced from the end of the bolt.

A further reduced portion 7 connects the outer head end 8 which is of the same size as the portion 5, thus forming a channel 9 under the head.

A cap-shaped member 10 is formed of a shape corresponding with the exterior of the nut, the inner surfaces fitting freely over the nut and the outer portion 11 is formed with a hole 12 adapted to fit over the squared portion 5 and abut the inner portion 4 of the stem 2, thereby locking the nut securely from turning.

A locking plate 13 preferably of circular form, is provided with a slot 14 extending inwardly from one side and adapted to fit over the narrow neck portion of the stem portion formed by the channel 9. The inner end of the slot is formed with a recess 15 at one side of a corresponding dimension to the neck of the stem. This lock plate is slipped under the head 8 after the cap has been placed in position and when shoved home to the bottom of the slot 14 it is moved sidewise to bring the recess 15 into engagement with the neck.

The cap 10 is provided with a key-shaped hole 16 arranged parallel with one side of the hole 12 and a corresponding hole 17 is formed in the lock plate 13, the latter hole being so positioned that when the lock plate is moved into its final position the said hole 17 will register with the hole 16.

When the lock plate is moved to its final position with the key holes registering, a key member 18 having a ward projecting from the inner end of the stem is inserted into the key hole and when turned therein it secures the lock plate from removal.

Figure 5:
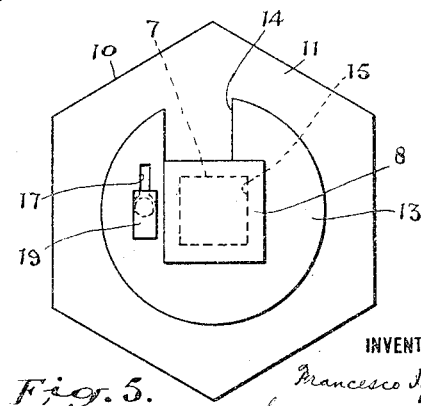
Fig. 5 is an end elevational view showing the locking members in their completely locked position.

The head 19 of the key 18 is preferably of oblong formation, the stem being secured adjacent to one end so that when the key is turned to the position shown in Fig. 5 it cannot turn except by the deliberate action of a person desiring to release it.

A nut lock such as described is very easily and quickly attached and may be as easily and quickly removed and without in any way marring either the bolt or the nut or without destroying the lock and may be replaced when the nut has been adjusted. It is extremely neat in its appearance and therefore is particularly adaptable for use on machinery of various kinds. Further, there are no projecting members which will be liable to catch upon the clothing or to injure a person.

What I claim as my invention is:—

1. In a nut lock, the combination with the bolt having a shoulder portion at its outer end and transverse channels beyond said shoulder portion, of a nut fastening member engaging the periphery of the nut and having a hole to receive the shoulder portion of the bolt, a lock plate having a slotted opening from the side adapted to fit over the channeled portion of the bolt, and a locking key adapted to secure the lock plate and the nut locking member in place.

2. In a nut lock, the combination with the bolt having a shoulder stem projecting from the threaded end, and transverse channels arranged beyond the shoulder portion, a cap shaped to fit over the periphery of the nut and having a hole through its outer face adapted to fit the shoulder portion of the bolt, a lock plate having a slot extending in from the side adapted to slip into the channeled portion of the bolt, the inner end of the slot having a recess at one side to receive the channeled stem, a key hole formed in the outer face of the cap, a key hole formed in the lock plate adapted to register with the key hole in the cap when said lock plate is moved so that the stem enters the recess of the slot therein, and a key adapted to be inserted through the said key holes and to be turned therein to lock the members together.

3. In a nut lock, the combination with a bolt having a reduced stem projection formed with a shouldered inner end and a further reduced portion, and a head at the outer end, a nut locking cap adapted to fit the periphery of the nut and having a hole in its outer face fitting the shoulder portion of the stem of the bolt and being spaced from the end of the threaded part of the bolt, said cap having a key hole arranged at one side of the center hole, a lock plate having a slot extending in from the edge and adapted to fit over the further reduced portion of the bolt stem and to engage the inner side of the head of said stem, said lock plate having a key hole adapted to register with the key hole in the cap, and a key having a stem portion formed with a projecting ward at its inner end, and a rectangular-shaped head, said stem being secured adjacent to one end of the head.

FRANCESCO IZZO.

Copies of this patent may be obtained for five cents each, by addressing the "Commissioner of Patents, Washington, D. C."